(12) United States Patent
Vitomir

(10) Patent No.: US 6,358,907 B1
(45) Date of Patent: Mar. 19, 2002

(54) AEROSOL FORMULATIONS

(75) Inventor: Sergio Vitomir, New Westminister (CA)

(73) Assignee: Napier Environmental Technologies Inc., Delta BC (*) Notice: Subject to any disclaimer, the term of this patent is extended or adjusted under 35 U.S.C. 154(b) by 0 days.

(21) Appl. No.: 09/632,648

(22) Filed: Aug. 4, 2000

Related U.S. Application Data

(63) Continuation-in-part of application No. 09/366,868, filed on Aug. 4, 1999, now Pat. No. 6,303,552.

(51) Int. Cl.$^7$ ............................. C11D 3/20; C11D 3/30; C11D 3/43; C11D 17/00

(52) U.S. Cl. .................. 510/406; 510/191; 510/199; 510/238; 510/254; 510/365; 510/499; 510/505; 134/40

(58) Field of Search ................. 510/191, 199, 510/238, 254, 365, 499, 406, 505; 134/40

(56) References Cited

U.S. PATENT DOCUMENTS

| | | | |
|---|---|---|---|
| 3,355,385 A | 11/1967 | Mackley | 252/104 |
| 3,979,219 A | 9/1976 | Chang et al. | 106/271 |
| 4,120,810 A | 10/1978 | Palmer | 252/153 |
| 4,269,724 A | 5/1981 | Hodson | 252/171 |
| 4,683,157 A | 7/1987 | Mosser et al. | 428/65 |
| 4,732,695 A | 3/1988 | Francisco | 252/162 |
| 4,812,255 A | 3/1989 | Suwala | 252/142 |
| 5,015,410 A | 5/1991 | Sullivan | 252/166 |
| 5,080,822 A | 1/1992 | VanEenam | 252/170 |
| 5,106,525 A | 4/1992 | Sullivan | 252/162 |
| 5,215,675 A | 6/1993 | Wilkins et al. | 252/100 |
| 5,319,055 A | 6/1994 | Sperry et al. | 528/49 |
| 5,387,363 A | 2/1995 | Distaso | 252/163 |
| 5,403,517 A | 4/1995 | Horinishi et al. | 252/551 |
| 5,405,548 A | 4/1995 | Distasao | 252/170 |
| 5,411,678 A | 5/1995 | Sim | 252/548 |
| 5,425,893 A | 6/1995 | Stevens | 252/166 |
| 5,427,710 A | 6/1995 | Stevens | 252/166 |
| 5,454,985 A | 10/1995 | Harbin | 252/558 |
| 5,518,661 A | 5/1996 | Langford et al. | 252/364 |
| 5,542,986 A | 8/1996 | Distaso | 134/38 |
| 5,569,410 A | 10/1996 | Distaso | 510/202 |
| 5,728,666 A | 3/1998 | Vitomir | 510/203 |
| 5,977,042 A | * 11/1999 | Hernandez et al. | 510/201 |
| 6,130,192 A | * 10/2000 | Vitomir | 510/202 |

FOREIGN PATENT DOCUMENTS

| | | | | |
|---|---|---|---|---|
| ES | 2008593 | 7/1935 | | |
| JP | 6298601 | 10/1994 | | A01N/25/06 |
| WO | 94/22965 | 10/1994 | | C09D/9/00 |

\* cited by examiner

*Primary Examiner*—Gregory Delcotto
(74) *Attorney, Agent, or Firm*—Darby & Darby

(57) ABSTRACT

The present invention is directed to an aerosol formulation comprising (A) a composition comprising (i) from about 20 to about 50% by weight of an aromatic alcohol, such as benzyl alcohol, (ii) from about 5 to about 50% by weight of an accelerator, and (iii) from about 0.5 to about 5.0% by weight of water, based upon 100% weight of total composition; and (B) a propellant. The aerosol formulation is useful for removing paints, coatings, grease, and other residues from various substrates. A method of preparing the aerosol formulation is also provided.

21 Claims, No Drawings

AEROSOL FORMULATIONS

This application is a continuation in part of Ser. No. 09/366,868, filed Aug. 4, 1999, now U.S. Pat. No. 6,303,552.

FIELD OF THE INVENTION

This invention relates to aerosol formulations for removing paint, grease, and other residues from various substrates and methods of preparing the same.

BACKGROUND OF THE INVENTION

For decades, strong acids and halocarbon solvent-based compositions were employed in stripping various protective coatings from metal and other substrates. Increased awareness of the detrimental impact of such paint strippers on health and environment, in recent years, resulted in government legislative bodies all over the world restricting and/or prohibiting the use of these materials.

Various hazardous solvents, such as methylene chloride and methyl alcohol, are often included in paint stripper compositions. Since these solvents may cause health and environmental problems when airborne, they are not suitable for use as an aerosol.

Most currently commercially available aerosol compositions for removing grease from oven surfaces and other substrates emit unpleasant odors and are caustic. Furthermore, these compositions often are not environmentally friendly.

Therefore, there is a need for effective paint stripper compositions which do not contain strong acids, halocarbon solvents, or other hazardous solvents and which may be applied as an aerosol. Also, there is a need for environmentally friendly aerosol grease removing compositions which are not odorous.

SUMMARY OF THE INVENTION

The present invention is directed to an aerosol formulation comprising (A) a composition comprising (i) from about 5 to about 50% by weight of aromatic alcohol, (ii) from about 0.5 to about 5.0% by weight of an accelerator, and (iii) from about 15 to about 60% by weight of water, based upon 100% weight of total composition; and (B) a propellant. The aerosol formulation of the present invention is effective at removing paint, coatings, grease, and other residues from substrates. It is also non-corrosive or only slightly corrosive to substrates, environmentally safe, non-hazardous, nonflammable, nontoxic, low odor, and fully biodegradable.

Another embodiment of the invention is an aerosol can containing the aerosol formulation of the present invention.

Yet another embodiment of the invention is a method of preparing the aerosol formulation comprising the steps of (A) dispersing (i) a polar phase containing (a) from about 10 to about 45 parts by weight of water and (b) from about 0.3 to about 4 parts by weight of an accelerator into a (ii) a non-polar phase containing from about 3 to about 35 parts by weight of aromatic alcohol to form a composition, and (B) adding from about 20 to about 50 parts by weight of a propellant to the composition to form the aerosol formulation.

Yet another embodiment of the invention is a method for removing paint or a coating from a substrate comprising applying a paint or coating removing effective amount of the aerosol formulation of the present invention.

Yet another embodiment of the invention is a method for removing grease and other residues from a substrate comprising applying a grease or residue removing effective amount of the aerosol formulation of the present invention.

DETAILED DESCRIPTION OF THE INVENTION

The aerosol formulation of the present invention comprises (A) a composition and (B) a propellent. The composition of the present invention comprises (i) from about 5 to about 50% by weight of (a) an aromatic alcohol having the formula

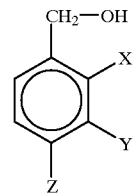

where X, Y, and Z are all hydrogen or two hydrogens and a methyl, (b) an aromatic alcohol having the formula

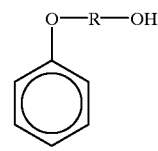

where R is ethylene, propylene, or isopropylene, or (c) a mixture thereof; (ii) from about 0.5 to about 5% by weight of an accelerator; and (iii) from about 15 to about 60% by weight of water, based upon 100% weight of total composition.

The composition typically has a pH of from about 7 to about 11 and preferably a pH of less than about 10. According to a preferred embodiment, the pH of the composition ranges from about 8 to about 9.

Suitable aromatic alcohols include, but are not limited to, benzyl alcohol, phenoxy propanol, phenoxy ethanol, and any combination of any of the foregoing. Preferably, the aromatic alcohol is benzyl alcohol. The composition preferably comprises from about 30 to about 40% by weight of aromatic alcohol, based upon 100% weight of total composition.

Suitable accelerators include, but are not limited to, alkanolamines, such as monoethanolamine, triethanolamine, and any combination of any of the foregoing. Preferably, the composition contains both monoethanolamine and triethanolamine. The weight ratio of monoethanolamine to triethanolamine is preferably from about 2:1 to about 1:2 and more preferably about 1:1. The composition preferably comprises from about 0.5 to about 3% by weight of an accelerator, based upon 100% weight of total composition.

The presence of deionized water in the composition enhances the overall stripping effectiveness of the composition. When the protective coating on a substrate to which the composition is applied is polar, e.g., polyurethanes, the presence of a solvent with a high dielectric constant such as water ($\in$=80.2@20° C.) has a positive effect in separating charged areas, thus allowing other solvents in the composition to soften the coating.

The water preferably contains no more than about 1% by weight of dissolved inorganic salts and preferably less than about 200 ppm. Distilled or deionized water having an electrical conductivity less than about 400 mho/cm is particularly preferred.

The composition preferably comprises from about 30 to about 60% by weight of water, based upon 100% weight of total composition.

Corrosion inhibitors may be added to the composition to control the corrosive action of the composition on an aerosol spray can as well as on metal substrates on which the composition is applied. Suitable corrosion inhibitors include, but are not limited, 2-mercaptobenzothiazole, toluoltriazole, benzotriazole, 2(3H)-benzothiazolethione, morpholine, sodium nitrite, sodium benzoate, and any combination of any of the foregoing. Preferred corrosion inhibitors include, but are not limited to, 2-mercaptobenzothiazole, morpholine, sodium nitrite, sodium benzoate, and any combination of any of the foregoing. The composition typically comprises a corrosion inhibiting or corrosion retarding effective amount of corrosion inhibitor. Preferably, the composition comprises from about 0.1 to about 3% by weight and more preferably from about 0.5 to about 1% by weight of corrosion inhibitor, based upon 100% weight of total composition.

The composition may also include an aromatic ether having the formula $R^1$—$CH_2$—O—$CH_2$—$R^2$ where $R^1$ and $R^2$ are hydrogen and phenyl or both phenyl. A preferred aromatic ether is benzyl ether. The composition preferably includes from about 1 to about 20% by weight of aromatic ether based upon 100% weight of total composition. The weight ratio of aromatic alcohol to aromatic ether is preferably from about 10:1 to about 5:1 and more preferably about 7:1.

An aromatic hydrocarbon cosolvent may be included in the composition. The aromatic hydrocarbon cosolvent may be a mixture of one or more aromatic hydrocarbon solvents. The aromatic hydrocarbon cosolvent improves the stability of the composition thereby increasing the shelf life of the composition. It also improves the rheological properties of the composition and the speed of penetration of the composition into paints, coatings, grease, and other residues. Furthermore, the aromatic hydrocarbon solvent reduces the surface tension and evaporation rate of the composition. Preferably, the aromatic hydrocarbon solvent has a flash point above about 150° F. and more preferably above about 190° F. Naphthalene depleted aromatic hydrocarbons are preferable since naphthalene has a noxious odor and is hazardous. Suitable aromatic hydrocarbon cosolvents include, but are not limited to, Aromatic 200ND™ available from Exxon Chemical Co. of Houston, Tex.; Solvesso 200™ available from Esso Corp. of Toronto, Canada; metaphenoxy benzyl alcohol; and any combination of any of the foregoing. The composition typically comprises from about 0.5 to about 40% by weight and more preferably from about 1 to about 20% by weight of aromatic hydrocarbon cosolvent, based upon 100% weight of total composition. The weight ratio of water to aromatic hydrocarbon cosolvent is typically from about 1.5:1 to about 30:1 and preferably from 3:1 to about 30:1.

The composition may include other adjuvants, such as coupling agents, rheology modifying agents, evaporation retardants, solubilizer-emulsifiers, stabilizers, chelating agents, and any combination of any of the foregoing.

Suitable coupling agents include, but are not limited to, alkylene glycols, dimethylsulfoxide, and any combination of any of the foregoing. A preferred coupling agent is propylene glycol. The composition typically comprises from about 0.5 to about 15% by weight and preferably from about 0.5 to about 5% by weight of coupling agent, based upon 100% weight of total composition.

Suitable rheology modifying agents include, but are not limited to, hydroxypropyl cellulose, hydroxypropyl methyl cellulose, hydroxyethyl cellulose, fumed silica, precipitated silica, castor oil, and any combination of any of the foregoing. A preferred rheology modifying agent is hydroxypropyl cellulose. The composition typically comprises from about 0.1 to about 5% by weight and preferably from about 0.1 to about 1% by weight of rheology modifying agent, based upon 100% weight of total composition.

Suitable evaporation retardants include, but are not limited to, silicone fluid, a water-based wax emulsion, paraffin oil, paraffin wax, and any combination of any of the foregoing. A preferred evaporation retardant is paraffin wax. The composition typically comprises from about 0.1 to about 3% by weight and preferably from about 0.1 to about 1% by weight of evaporation retardant, based upon 100% weight of total composition.

Suitable solubilizer-emulsifiers include, but are not limited to, fluorinated alkyl esters; polyethoxylated sorbitan ester, such as polyethoxylated sorbitan monolaurate, polyethoxylated sorbitan monopalmitate, polyethoxylated sorbitan monostearate, polyethoxylated sorbitan tristearate, and polyethoxylated sorbitan monooleate; trioleate polysorbates; and any combination of any of the foregoing. A preferred solubilizer-emulsifier is polyethoxylated sorbitan monooleate. The paint stripper composition typically comprises from about 0.1 to about 5% by weight and preferably from about 0.1 to about 3% by weight of solubilizer-emulsifier, based upon 100% weight of total composition.

Suitable stabilizers include, but are not limited to, acetanilide. The paint stripper composition typically comprises from about 0.01 to about 3% by weight of stabilizer, based upon 100% weight of total composition.

Suitable chelating agents include, but are not limited to, sodium salts of phosphonic acids, such as bis(hexamethylene)triamino penta(methylene phosphonic) acid and phosphoric acid; sodium salts of citric acid; sodium salts of ethylenediaminetetraacetic acid (EDTA); and any combination of any of the foregoing. The composition typically comprises from about 0.5 to about 4% by weight and preferably from about 0.5 to about 2% by weight of chelating agent, based upon 100% weight of total composition.

Other adjuvants as known to those skilled in the art may also be included in the composition.

The composition is preferably substantially free of peroxides, such as hydrogen peroxide; acids; and hazardous solvents, such as methyl chloride and methyl alcohol. More preferably, the composition contains less than 1% of each of these substances and most preferably is free of these substances. Peroxides and acids may react with the metal of an aerosol can and cause the can to explode. Hazardous solvents may have a detrimental impact on health and the environment when airborne.

The aerosol formulation typically comprises from about 50 to about 80% by weight and preferably from about 70 to about 80% by weight of the composition, based upon 100% weight of total aerosol formulation.

Suitable propellents, include but are not limited to, dimethyl ether, hydrocarbons, and compressed air. A preferred propellant is dimethyl ether. The aerosol formulation typically comprises from about 20 to about 50% by weight and preferably from about 20 to about 30% by weight of propellant, based upon 100% weight of total aerosol formulation.

Another embodiment of the invention is an aerosol can containing the aerosol formulation of the present invention.

The aerosol formulations of the present invention are prepared as follows. A polar phase comprising deionized or distilled water and an accelerator is admixed with a non-polar phase comprising aromatic alcohol with continuous mixing to form the composition.

The polar phase is prepared by admixing, with continuous mixing, from about 15 to about 60 parts by weight of deionized or distilled water and from about 0.5 to about 5 parts by weight of an accelerator. Preferably, from about 1 to about 20 parts by weight of aromatic hydrocarbon cosolvent, from about 0.5 to about 5 parts by weight of coupling agent, and from about 0.1 to about 3 parts by weight of solubilizer-emulsifier are added to the polar phase. A stabilizer and chelating agent may also be added to the polar phase.

An aromatic ether, corrosion inhibitor, evaporation retardant, and rheology modifying agent may be added to the non-polar phase. Typically, the non-polar phase comprises from about 5 to about 50 parts by weight and preferably from about 30 to about 45 parts by weight of the composition, based upon 100 parts by weight of total composition.

A propellant is then added to the composition to yield the aerosol formulation of the present invention. Preferably, from about 20 to about 50 parts by weight of propellant are added to the composition.

The propellant may be added by any method known in the art. One method for adding the propellant is as follows. The composition is introduced into a spray can or other container. The container is vacuumed and a propellant, such as dimethyl ether, is injected into the container. The container is then sealed, closed or capped, preferably with a valve.

The aerosol formulations of the present invention are useful in removing and stripping paints, such as oil-based paints, and various other protective coatings, such as epoxies, polysulfides, urethanes, polyurethanes, vinyl esters, alkyds, and acrylics. A paint or coating removing and/or stripping effective amount of the formulation is applied to the substrate. This amount can be determined by a user of the formulation by any method known in the art.

The aerosol formulations are also useful for removing grease and other residues, such as oil, adhesives, tar, asphalt, inks, and dyes, from a substrate. A grease or residue removing effective amount of the formulation is applied to the substrate. This amount can be determined by a user of the formulation by any method known in the art.

The aerosol formulation preferably foams when sprayed onto a substrate. Foaming typically enhances penetration of the aerosol formulation onto a painted or coated substrate. According to one embodiment of the invention, the aerosol formulation is typically applied from approximately 1.0 to approximately 1.5 oz/ft$^2$ and preferably about 1.2 oz/ft$^2$.

The composition may need to be applied one or more times to remove one or more coatings, grease, or the other residues from a substrate.

Examples of suitable substrates include, but are not limited to, metallic substrates, such as steel, aluminum, brass and other alloys; wood; glass; plastics; and masonry.

Methods of applying the formulation include, but are not limited to, spraying, soaking, immersing, brushing, and the like. Preferably, the formulation of the present invention is sprayed onto the substrate as an aerosol.

DESCRIPTION OF THE PREFERRED EMBODIMENTS

The following examples illustrate the invention without limitation. All parts and percentages are given by weight unless otherwise indicated.

EXAMPLE 1

The composition in Table 1 was prepared as follows. Paraffin wax, 3-mercaptobenzothiazole, morpholine, sodium nitrite, sodium benzoate, and hydroxypropyl cellulose were added to benzyl alcohol with continuous mixing to form a non-polar mixture. A polar mixture was prepared by admixing deionized water, triethanolamine, monoethanolamine, propylene glycol, polyethoxylated sorbitan monooleate, and an aromatic hydrocarbon cosolvent (Solvesso 200™). The non-polar mixture was dispersed into the polar mixture to form the composition as a paste.

TABLE 1

| Ingredient | % Weight |
| --- | --- |
| Benzyl Alcohol | 35.00 |
| Solvesso 200 ™[1] | 6.60 |
| Paraffin Wax | 0.30 |
| Polyethoxylated Sorbitan Monooleate | 0.50 |
| Hydroxypropyl Cellulose | 0.25 |
| Propylene Glycol | 1.50 |
| 2-Mercaptobenzothiazole | 0.30 |
| Triethanolamine | 1.00 |
| Monoethanolamine | 1.00 |
| Morpholine | 0.29 |
| Sodium Nitrite | 0.29 |
| Sodium Benzoate | 0.29 |
| Water | 52.68 |
| Total | 100.00 |

[1]Solvesso 200 ™ is available from Esso Corporation of Toronto, Canada.

EXAMPLE 2

An aerosol formulation containing the composition of Example 1 and dimethyl ether was prepared as follows. The composition of Example 1 was placed into a spray can. The can was vacuumed. Dimethyl ether was injected into the can and the can was pressurized until the can contained 70% by weight of the composition and 30% by weight of dimethyl ether.

COMPARATIVE EXAMPLE 3

The procedure in Example 1 was repeated except monoethanolamine and triethanolamine were replaced with water.

COMPARATIVE EXAMPLE 4

The procedure in Example 1 was repeated except monoethanolamine was replaced with water.

COMPARATIVE EXAMPLE 5

The procedure in Example 1 was repeated except triethanolamine was replaced with water.

EXAMPLE 6

5 steel test panels were coated with a fully cured solvent based alkyd resin system.

The paint stripper compositions of Example 1 and Comparative Examples 3–6 and the aerosol formulation of Example 2 were tested as follows. A panel was laid horizontally. The composition was applied to the test panels at room temperature. The test panels were then positioned vertically. The effectiveness of the composition was evaluated based upon the amount of paint which could be removed with minimal, average, or a fair amount of force 5, 10, 15, 20, 30, 45, and 60 minutes after application of the composition. The degree of lifting of the coating from the substrate, also known as the orange peel effect, was observed. Also, the percent of composition remaining on the test panel 60 minutes after application of the composition was determined. The results are shown in Table 1 below.

TABLE 1

| Stripper Composition | Time (minutes) | | | | | | | Degree of Lifting | Percent Stripper Composition Remaining on Panel after 60 minutes | Form of Stripper Composition |
|---|---|---|---|---|---|---|---|---|---|---|
| | 5 | 10 | 15 | 20 | 30 | 45 | 60 | | | |
| Example 1 | 1 | 2 | 2 | 3 | 4 | 5 | 5 | Good lifting within 45 minutes | 75 | Paste |
| Example 2 | 4 | 4 | 4 | 5 | 5 | 5 | 5 | Good lifting within 20 minutes | 95 | Aerosol |
| Comparative Example 3 | 1 | 1 | 1 | 2 | 3 | 3 | 3 | Poor lifting after 60 minutes | 75 | Paste |
| Comparative Example 4 | 1 | 2 | 2 | 2 | 3 | 4 | 5 | Good lifting within 60 minutes | 75 | Paste |
| Comparative Example 5 | 1 | 2 | 2 | 2 | 2 | 2 | 2 | Poor lifting after 60 minutes | 5 | Paste |

1—No apparent stripping with a scraper with a fair amount of force.
2—Negligible stripping with a scraper with a fair amount of force.
3—Some stripping with a scraper with an average amount of force.
4—Majority stripped with a scraper with minimal force.
5—Complete stripping with scraper with minimal force.

EXAMPLE 7

The composition prepared in Example 1 was tested as follows to determine its efficacy for removing food, grease, and carbon adhered to metal surfaces. The composition was tested on three different types of substrates by spraying the composition as an aerosol (as prepared in Example 2). The three types of substrates were:
1. Used kitchen equipment which had thick build-up of food, grease, and carbon adhered to it. In spots, the layers were ¼" thick.
2. Domestic ovens and grill interiors which had baked on carbon and carbon deposits which have been blackened with repeated use of the ovens and grills.
3. The underside of pots and pans which have a crust of blackened soot and carbon firmly adhered to the metal.

The time necessary to remove the residues on each metal surface after applying the paint stripper composition was determined. The tests were repeated with a commercial oven cleaner on the market. The results are shown in Table 2 below.

TABLE 2

| Substrate | Aerosol (minutes) | Commercial Brand* (minutes) |
|---|---|---|
| Used Kitchen Equipment | 90 | Did Not Work |
| Ovens and Grills | 20 | 30 |
| Pots and Pans | 60 | 15 |

*The commercial brand contained methylene chloride, toluene, and other caustic chemicals.

No heat, pressure, or abrasion was applied to the substrate after application of the aerosol and the commercial brand.

All patents, applications, articles, publications, and test methods mentioned above are hereby incorporated by reference.

Many variations of the present invention will suggest themselves to those skilled in the art in light of the above detailed description. Such obvious variations are within the full intended scope of the appended claims.

What is claimed is:
1. A method of removing grease from a substrate comprising applying a grease or residue removing effective amount of an aerosol formulation, the areosol formulation comprising

(A) a composition comprising
 (i) from about 5 to about 50% by weight of
  (a) an aromatic alcohol having the formula

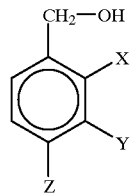

wherein X, Y, and Z are all hydrogen or two hydrogens and a methyl,
  (b) an aromatic alcohol having the formula

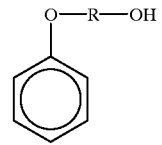

wherein R is ethylene, propylene, or isopropylene, or
  (c) a mixture thereof;
 (ii) from about 0.5 to about 3.0% by weight of at least one alkanolamine;
 (iii) from about 0.1% to about 3% of a corrosion inhibitor; and
 (iv) from about 15 to about 60% by weight of water, based upon 100% weight of total composition; and
(B) a propellant.

2. The method of claim 1, wherein the aerosol formulation is applied from an aerosol can.

3. The method of claim 1, wherein said aromatic alcohol is benzyl alcohol.

4. The method of claim 1, wherein said composition comprises from about 30 to about 40% by weight of said aromatic alcohol, based upon 100% weight of total composition.

5. The method of claim 1, wherein said alkanolamine is selected from the group consisting of monoethanolamine, triethanolamine, and any combination of any of the foregoing.

6. The method of claim 1, wherein said alkanolamine is a mixture of monoethanolamine and triethanolamine.

7. The method of claim 1, wherein said aerosol formulation comprises from about 50 to about 80% by weight of said composition, based upon 100% weight of total aerosol formulation.

8. The method of claim 1, wherein said propellent comprises dimethyl ether.

9. The method of claim 1, wherein said aerosol formulation comprises from about 20 to about 50% by weight of said propellant, based upon 100% weight of total aerosol formulation.

10. The method of claim 1, wherein said composition has a pH of about 10 to about 11.

11. The method of claim 1, wherein said aerosol formulation foams upon being dispensed.

12. The method of claim 1, wherein said corrosion inhibitor is selected from the group consisting of 2-mercaptobenzothiazole, toluoltriazole, benzotriazole, 2(3H)-benzothiazolethione, morpholine, sodium nitrite, sodium benzoate, and any combination of any of the foregoing.

13. The method of claim 1, wherein said composition further comprises an aromatic ether having the formula $R^1$—$CH_2$—O—$CH_2$—$R^2$ where $R^1$ and $R^2$ are hydrogen and phenyl or both phenyl.

14. The method of claim 1, wherein said composition further comprises an aromatic hydrocarbon cosolvent.

15. The method of claim 14, wherein said aromatic hydrocarbon cosolvent is a naphthalene depleted aromatic hydrocarbon cosolvent.

16. The method of claim 14, wherein said aromatic hydrocarbon cosolvent has a flash point above about 150° F.

17. The method of claim 1, wherein said composition further comprises a coupling agent, rheology modifying agent, evaporation retardant, solubilizer-emulsifier, stabilizer, chelating agent, and any combination of any of the foregoing.

18. The method of claim 17, wherein said coupling agent is an alkylene glycol.

19. The method of claim 17, wherein said rheology modifying agent is selected from the group consisting of hydroxypropyl cellulose, hydroxypropyl methyl cellulose, hydroxyethyl cellulose, fumed silica, precipitated silica, castor oil, and any combination of any of the foregoing.

20. The method of claim 17, wherein said evaporation retardant is selected from the group consisting of silicone fluid, water-based wax emulsion, paraffin oil, paraffin wax, and any combination of any of the foregoing.

21. The method of claim 17, wherein said solubilizer-emulsifier is selected from the group consisting of a polyethoxylated sorbitan ester, a trioleate polysorbate, a fluorinated alkyl ester and any combination of any of the foregoing.

* * * * *